United States Patent
Migliorati

(10) Patent No.: US 8,302,931 B2
(45) Date of Patent: Nov. 6, 2012

(54) FINELY ADJUSTABLE FIRING VALVE FOR RAPIDLY DISCHARGING COMPRESSED AIR OR GAS

(75) Inventor: Genio Migliorati, Bergamo (IT)

(73) Assignee: Larix S.R.L., Bergamo (IT)

( * ) Notice: Subject to any disclaimer, the term of this patent is extended or adjusted under 35 U.S.C. 154(b) by 258 days.

(21) Appl. No.: 12/831,748

(22) Filed: Jul. 7, 2010

(65) Prior Publication Data
US 2011/0006238 A1   Jan. 13, 2011

(30) Foreign Application Priority Data
Jul. 9, 2009   (IT) .............................. BG2009A0039

(51) Int. Cl.
*F16K 31/12*   (2006.01)

(52) U.S. Cl. .................................... 251/29; 251/30.031

(58) Field of Classification Search .................... 251/25, 251/28, 29, 30.03
See application file for complete search history.

(56) References Cited

U.S. PATENT DOCUMENTS

| | | | | |
|---|---|---|---|---|
| 2,373,654 | A | * | 4/1945 | Beekley et al. ................. 251/86 |
| 2,523,826 | A | * | 9/1950 | Heinzelman .................. 137/487 |
| 3,592,224 | A | * | 7/1971 | Bois .............................. 137/462 |
| 4,376,523 | A |   | 3/1983 | Goyen |
| 5,520,366 | A | * | 5/1996 | Elliott ........................ 251/30.01 |
| 6,354,562 | B1 | * | 3/2002 | Fukano et al. ............. 251/30.03 |
| 2004/0173765 | A1 | * | 9/2004 | Hsi-Chun .................. 251/30.02 |
| 2004/0211477 | A1 | * | 10/2004 | Ezaki et al. .................... 137/877 |

FOREIGN PATENT DOCUMENTS
WO   WO 2005/052424   6/2005
WO   WO 2008/009337   1/2008

* cited by examiner

*Primary Examiner* — John K Fristoe, Jr.
*Assistant Examiner* — R. K. Arundale
(74) *Attorney, Agent, or Firm* — King & Schickli, PLLC

(57) ABSTRACT

A finely adjustable firing valve comprising a first valve (10) providing a first inlet (20) and a first discharge (21) connected through a first actuation chamber (22), and having a first shutter (23), a second valve (11) having a second shutter (37), a third valve (12), having a third shutter (43), characterized in that it comprises a piston (24) bound to said first shutter (23) that slides within said first chamber (22), of such a size that the upper surface of said piston (24) affected by the pressure inside said first chamber (22) is substantially equal to the lower surface of said piston (24) affected by the pressure existing in said first inlet (20).

15 Claims, 3 Drawing Sheets

FINELY ADJUSTABLE FIRING VALVE FOR RAPIDLY DISCHARGING COMPRESSED AIR OR GAS

This application claims the benefit of and priority to Italian Patent Application No. BG2009A000039, filed Jul. 9, 2009, hereby incorporated by reference.

FIELD OF THE INVENTION

The present invention relates to a finely adjustable valve for rapidly discharging compressed air or compressed gas, for the purpose of generating a pressure wave in silos or containers of granular materials.

In the state of the art, when preparing cements or agglomerates of various types, granular and pulverulent materials are used and forced to flow from hoppers or silos.

BACKGROUND OF THE INVENTION

These materials often tend to undergo compaction creating solid lumps which hinder or even prevent material outflow.

These solid lumps are generally disintegrated and their constituent materials liquefied using powerful jets of air or other gases using a technique known as "firing".

This technique almost instantaneously introduces a large quantity of compressed gas at high pressures into the vicinity of these solid lumps, to produce impact waves which disintegrate them.

The gas quantity introduced must be such as to completely disperse its kinetic energy into the material to be found in the silo or hopper.

In firing valves, in most cases, only the high pressure part of the outflow is important for the purpose to be attained. The low pressure tail represents only a fluid loss which must be re-established.

The useful energy of the air used in firing from the vessel regards the initial impact wave pulse at maximum pressure, between 5 and 10 bars (1 bar=100000 Pa), even better at a pressure between 7 and 10 bars, whereas the firing tail, below 7 bars, may not have any practical effect and represents a loss, considering that this tail is also reloaded into the vessel to restore the starting conditions.

In patent application MI2002A000627, a system of valves is described which enables air discharge to be limited upon reaching a pressure set by a pressure setting device. The valve system is composed of valves having a metal or, in any case, a rigid piston as the shutter.

In the patent application WO2008009337, membrane type shutters are used instead.

SUMMARY OF THE INVENTION

The purpose of the present invention is to provide a valve that allows fine adjustment and hence a discharge controlled by very small pressure differentials.

Another purpose is to provide a valve that is both strong and fast at the same time.

A further purpose is to provide a valve that is able to operate in high temperature environments without the risk of wear of its parts.

In accordance with the present invention, these and further purposes are achieved by a finely adjustable firing valve.

Additional features of the invention are described herein.

BRIEF DESCRIPTION OF THE DRAWING FIGURES

The characteristics and advantages of the present invention will be apparent from the ensuing detailed description of an embodiment thereof, provided by way of non-limiting example with reference to the accompanying drawings, in which.

DETAILED DESCRIPTION OF THE INVENTION

Figure 1:
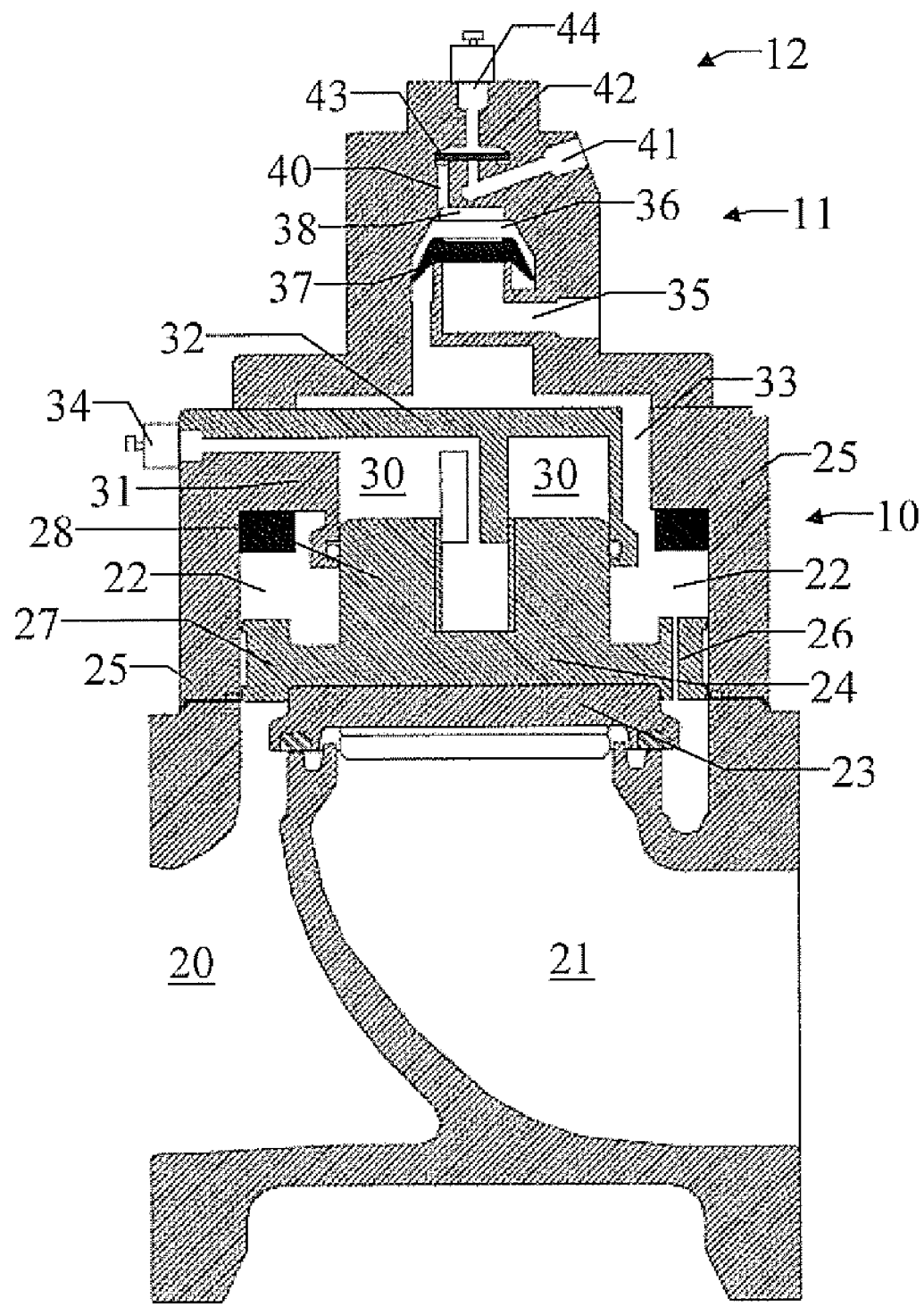
FIG. 1 shows schematically a finely adjustable firing valve, seen in sectional view with the primary shutter closed, according to the present invention.
Figure 2:
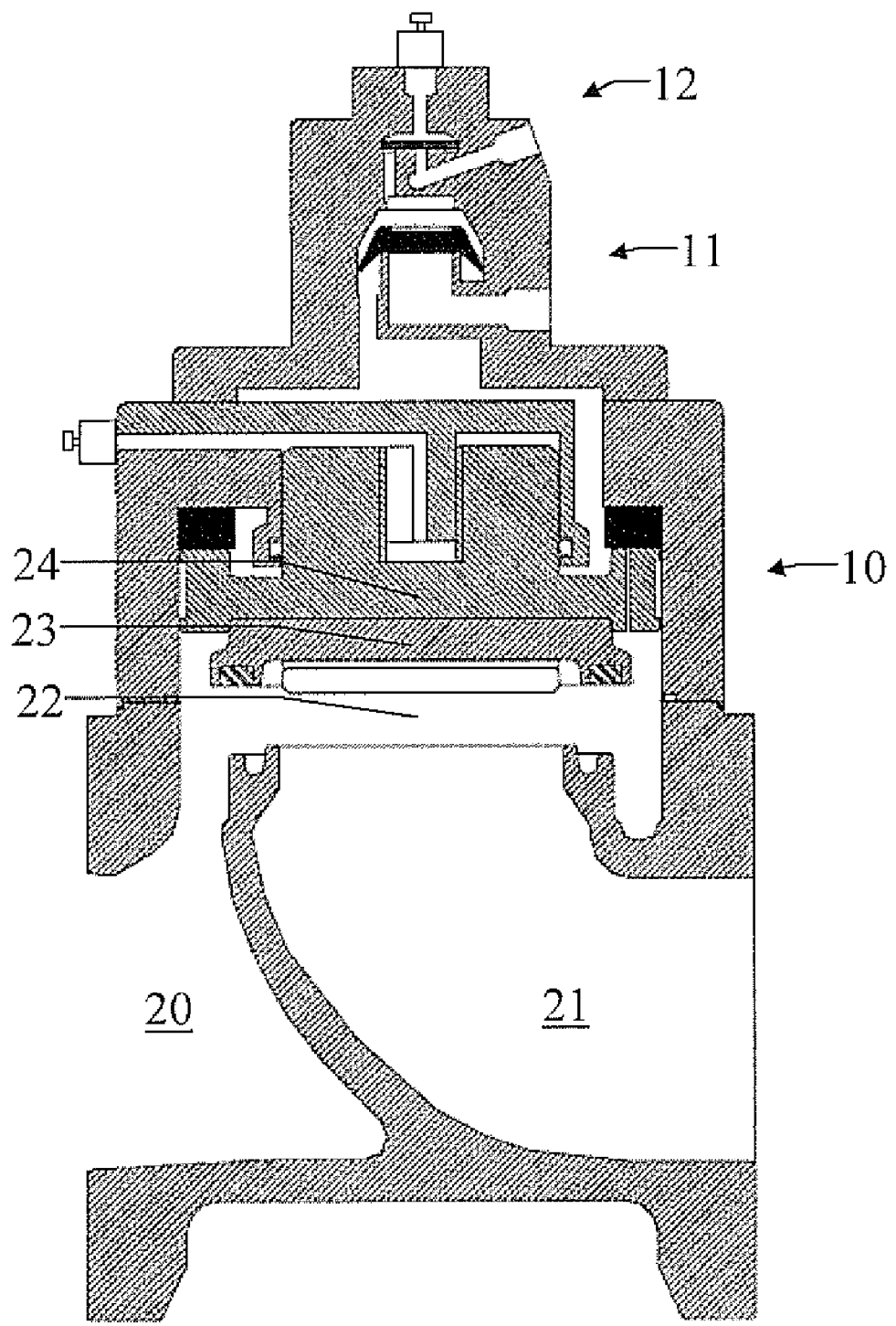
FIG. 2 shows schematically a finely adjustable firing valve, seen in sectional view with the primary shutter open, according to the present invention.
Figure 3:
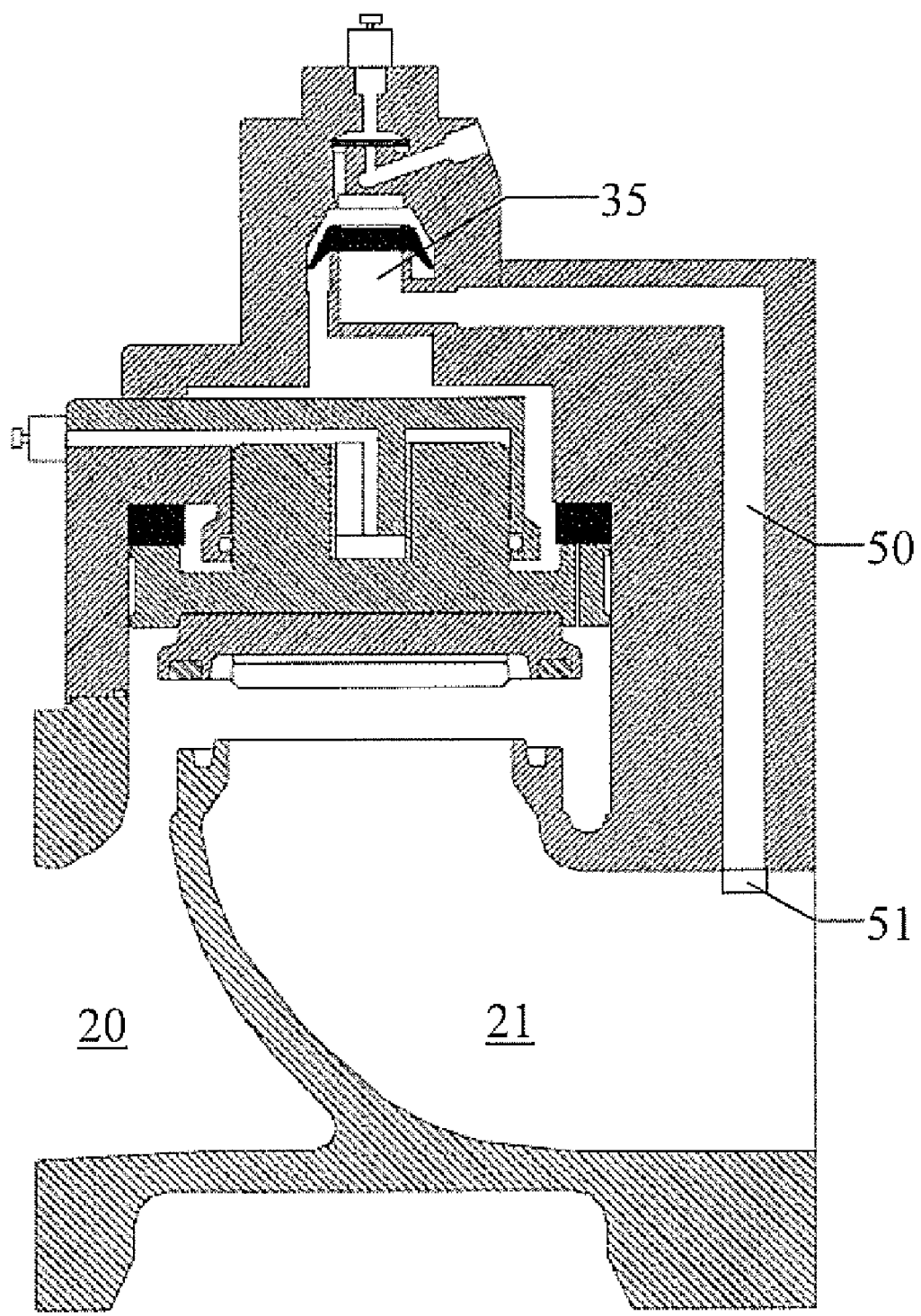
FIG. 3 shows schematically a finely adjustable firing valve, seen in sectional view with the primary shutter open, and with a conduit that connects the second discharge valve with the silos, according to the present invention.

In the firing valves of the known art, particularly mechanical ones, the main chamber is very large in order to freely allow the piston to rise and fall. More specifically, the upper surface of the piston affected by the above-held gas is relatively large. As we all know the force that is exercised upon the piston is equal to the pressure effected upon the surface.

Therefore, in order to raise the piston a lower greater force is needed than that previously discussed. But usually the lower surface of the piston on which the pressure is applied is lesser than the upper one due to the presence of a large exit conduit.

Therefore, in the known art, you must have a very large delta of pressure to open the main shutter.

This imposes a very low control pressure, making it impossible to achieve a minimum delta of pressure between the maximum pressure and the programmed pressure.

The Applicant has perceived the need to reduce in some way, the piston upper surface in order to reduce the delta of pressure.

In addition, he also realized that by defining an additional chamber above the piston and providing an additional pre-set and adjustable pressure independent from the other pressures applied to this new chamber, it is possible to precisely adjust the operation of the firing valve.

With reference to the attached figures, a pneumatic firing valve, according to the invention, comprises a total of three valves. The main valve 10 is controlled by the secondary valve 11 which, being of smaller dimensions than the main valve 10, can be operated by the feeding of a smaller mass of gas. The secondary valve is itself controlled by a pilot valve 12 which has smaller dimensions than the secondary valve and can hence be operated by feeding a smaller mass of gas than that required for the secondary valve.

The firing valve and thus the valves 10, 11 and 12 have a preferably circular configuration, but can have other shapes.

The main valve 10 has an inlet 20, connected to a local storage tank of compressed air, and an access outlet 21 to a silo.

The inlet 20 is placed in communication with a outlet 21 by a main actuation annular chamber 22. The passage between the inlet 20 and outlet 21 is controlled by a first round shutter 23, bound to a piston 24.

The chamber 22 is bounded externally by a circular structure 25.

The piston 24 includes a hole 26 of small size (able to pass a flow of about $1/1000$ compared to the flow passing between the inlet 20 and outlet 21 when the shutter 23 is open) which puts in communication the chamber 22 with the inlet 20.

The shutter 23 and the piston 24 can move within the main actuation chamber 22, raising or lowering in order to alternately place in communication the inlet 20 with the outlet 21.

The piston 24 consists of two main parts. A lower part 27 with a diameter slightly smaller than the inside diameter of the structure 25, which guides the sliding piston 24. An upper part 28 of smaller diameter than the diameter of the lower part 27, which slides inside a chamber 30, produced inside the chamber 22, and isolated from it.

The chamber 30 is bounded on one side, by a portion 31 of structure 25 that extends into the chamber 22, leaving at the same time, space in the chamber 22 for the movement of the lower part 27 of the piston 24.

A head 32 covers and surrounds, on the other side, the upper part 28 of the piston 24. The head 32 does not extend to the entire area of the chamber 22, leaving room for a passage conduit 33 connected to the chamber 22.

The upper part 28 of the piston 24 slides laterally guided by the portion 31 and the head 32.

The piston 24 includes suitable sealing elements (gaskets, o-rings) at the sliding points along its guides.

The chamber 30 comprises a conduit 34 which reaches the outside.

The conduit 33 continues upwards to reach the valve 11.

Centrally the piston 24 presents a hole with a piston rod guide for axially driving the actual piston.

The valve 11 includes the conduit 33 which is placed in communication with a conduit 35, which in one embodiment of the invention, communicates with the outside via an annular chamber 36. The passage between the conduit 33 and the conduit 35 is controlled by a cup type second shutter 37, for example.

The chamber 36 presents an upper chamber 38 that when the shutter 37 is open, and raised, it is not obstructed by the shutter 37 itself.

A further conduit 40 connects the chambers 36 and 38 with the valve 12.

The valve 12 includes the conduit 40 which is placed in communication with a conduit 41 that communicates with the outside via an annular chamber 42. The passage between the conduit 33 and the conduit 35 is controlled by a third shutter 43.

The chamber 42 comprises a conduit 44 that reaches the outside.

Chambers 22, 30, 36, 38 and 42 are all annular-shaped.

Accesses from outside of the firing valve are represented by conduits 20, 21, 34, 35, 41 and 44.

In the figures, the conduits 20, 21, 34, 35, 41 and 44 are represented, for convenience of description, variously arranged within the valve, but in reality they are arranged or rather, carried by conduits, all close together to facilitate connection with their relative adduction conduits.

The conduit 20 is connected to a local storage tank of pressurized gas, with suitable dimensions for providing gas under pressure (5-15 bars) for an instant in the order of milliseconds, therefore in the order of few liters of gas, for example between 2 and 300 liters.

The conduit 21 is an outlet access to a silo where it is desired to generate a pressure wave.

The conduit 34 is connected to an adduction of gas set at a fixed and adjustable pressure that allows a fine tuning of the operating conditions of the valve.

The conduit 35 is connected to the outside and is considered a discharge outlet of gas during operation of the valve. In one embodiment of the invention, the discharge takes place inside the environment, in another embodiment it occurs inside the silos.

The conduit 41 serves as an inlet for filling the storage tank (connected to inlet 20) and therefore is powered by a pressure gas generator, and at the same time it is used as an actuator of the firing valve, bringing the supply pressure which is normally in the of order of 5 to 15 bars to the pressure of 0 bar or otherwise to the atmospheric pressure.

A fixed and adjustable pressure is applied to the conduit 44 representing the pressure at which it is desirable to block the shot of gas into the silos. Such adjustment, according to the present invention is carried out in combination with the set pressure on the conduit 34. For example, with a supply pressure of 10 bars (to the conduit 41) one wishes to activate a gas shot until reaching the pressure of 7 bars. At the activation of the valve, the gas at 10 bars is shot into the silos until the pressure within the valve reaches 7 bars, leaving it stored and present in the conduit 20. The recharging of the storage tank will be only have to restore the 3 bar shot.

This shutter 43 is designed so that if the pressure in chamber 42 is higher than that in the conduit 40, it allows (by flexing laterally) a flow of gas from the chamber 42 to conduit 40.

The shutter 37 is designed in such a way that if the pressure in chambers 36 and/or 38 is greater than that in the conduit 33 it allows (by flexing laterally) a gas flow from the chambers 36/38 to the conduit 33.

In a variant of the present invention the conduit 35, to prevent air or gas to be discharged directly outside, it can be connected via a conduit 50 to outlet 21. The conduit 50 ends with a one way valve 51. The pipe may be external or formed directly within the valve.

The material of the valve is a metal (aluminum, steel, cast iron), or alternatively plastic material suitable for this purpose can be used.

The operation of the firing valve according to the invention can be divided into three steps: a charging step, a rest step and a discharge step.

It is assumed that to the conduit 41 there is a supply pressure of 10 bars, to the conduit 44 a pressure of 7 bars and to the conduit 34 a pressure of 3 bars.

The supply pressure of the valve is typically unified (such as that applied to the supply conduit 41 for example). All other pressures applied to the valve are set by adjustable pressure reducers not shown.

During the charging step, a compressed gas supply device, for example at 10 bars, is connected to the conduit 41. The gas under pressure lifts the pilot shutter 43 and enters the connection conduit 40. Through the connection conduit 40 the pressurized gas entering the secondary actuation chamber 36, is able to bypass the secondary shutter 37 (by flexing it) and enters the main actuation chamber 22 via the connection conduit 33.

From the main actuation chamber 22 the pressurized gas via the hole 26 passes through the inlet 20, which is connected to a compressed air storage element, i.e. a storage tank to which the firing valve is connected. The charging step continues until the pressure in the storage tank is equal to the supply pressure.

During the resting step the storage tank is at the same pressure of the compressed gas feeding device, in the conduit 41, therefore the compressed gas ceases to flow to the storage tank.

During the discharging step, when the compressed gas supply device is disconnected from the conduit 41, reaching a pressure of 0 bar (or at least equal to the atmospheric pressure) the higher pressure below in chamber 22, (initially 10 bars) raises the shutter 37, the gas flows from the conduit 33 towards the chamber 36 and flows to the outside from the conduit 35.

During opening, the shutter 37 is in abutment isolating the chamber 38 and the conduit 40, therefore isolating the valve 12.

The pressurized gas flowing from the secondary actuation chamber 36, driven by the pressure in the main actuation chamber 22, creates a vacuum in this chamber which raises the main shutter 23 with the piston 24, driven by the pressure in the storage tank through the inlet 20, and the pressurized gas in the storage tank flows violently through the conduit 21, creating the pressure wave able to crush blocks of material that are formed inside the silo to which the firing valve is connected.

As soon as the pressure in the conduit 20, and consequently in the various chambers and conduits in which occurs the discharge of gas drops (only a few tenths of bars) compared to the pre-set control pressure in the conduit 44, the present higher pressure flexes the shutter 43 and fills the chamber 38, and when the below pressure is reached, it closes the shutter 37, the exiting gas flow from the conduit 35 terminates.

The higher pressure present in the chambers 38 and 36 flexes the shutter 37, and passing through the conduit 33 fills the chamber 22 and closes the shutter 23, blocking the shot.

The shutters 43, 37 and 23 re-close the respective discharges precluding the release of additional air, which therefore remains stored in the tank with a pressure set near to the set value of conduit 44.

It is noted that the gas flow from the conduit 35 towards the outside is insignificant compared to the flow through the main conduits 20 and 21.

According to the present invention, the piston 24 is designed so as to minimize the area of the chamber 22. In particular, the area of the chamber 22 is reduced compared to the known art, and it is brought to a value almost similar (equal or less) to the area directly below the piston 24, i.e. the terminal annular area of the inlet 20.

In this way, at the same pressure, the force exerted upon the two surfaces of the shutter 23 is similar. It is therefore possible to be more precise in the regulation of the deltas of pressure of the opening and closing of the shutter 23.

Furthermore the chamber 30 is added, preferably of a smaller area than chamber 22, being on a circular crown of an inferior radius than that of chamber 22, to which a conduit 34 is connected and upon which a pre-set and adjustable pressure may be regulated. In this way, it is possible to finely adjust the regulation pressure of the valve.

The area of the upper surface of the chamber 22 could also be lesser than the area below, such a difference in area could be balanced by an increased pressure in conduit 34.

It should be kept in mind that pressure reducers cannot guarantee accuracy and a high repeatability, in fact, they have very wide tolerances that do not permit fine adjustments.

By first using, according to the present invention, a reduced area 22, and also, preferably using a different set point, by combining the two adjustment points (conduits 44 and 34), it is possible to adjust with sufficient precision the operating pressures of the firing valve.

According to conducted tests, you can set for example, a supply pressure of 7.6 bars to the conduit 41, a pressure of 4 bars to the conduit 44, and adjusting the pressure to the conduit 34, with unitary values increasing from 0 to 6 obtaining a re-closing pressure of the shutter 23 (practically, it is the pressure that remains in the container connected to the inlet 20), respectively of a value from 2.5 to 5.5 bars, each with steps of 0.5 bars.

If instead the pressure to the conduit 34 remains unaltered, a re-closing pressure of the shutter 23 is obtained, at the variation of the pressure to the conduit 44 of exponential type, therefore with problems for adjustment, especially for obtaining minimum pressure deltas at maximum pressure.

Due to the fact that the main valve 10 is controlled by a secondary valve 11 smaller than the principal one, with a first connection conduit 33 of a lower volume than that of the main actuation chamber 22, and in turn the secondary valve 11 is controlled by a pilot valve 12 also of smaller dimensions than those of the secondary valve 11, with a second connection conduit 40 of smaller volume than the secondary actuation camber 36, it is possible to achieve fine tuning and control the discharge of the storage tank under pressure connected to the inlet 20 with minimum pressure differences in the order of 0.5-1 bar. It is then possible to discharge, for example, from 10 bars to 9 bars, avoiding to empty the storage tank and making the recovery of the compressed air supply very easy and inexpensive.

The applications of the present invention are many. For example, distribution lines for shots of compressed air or other fluids, the handling of bulk materials, with variable capabilities and sections of thrust according to the requirements of the handling zones. Lines for the prevention and cleaning of dust deposits and scalings in warming towers in the cycle of cement production.

Removal of dust deposits in heat exchangers.

Fluidification systems via air bubble and other gases.

Practically, the materials used for the valve, an also its size, may be of all kinds according to the needs and the state of the art.

The firing valve thus conceived is susceptible to numerous modifications and variants, all failing within the inventive concept, moreover, all details can be replaced by technically equivalent elements.

The invention claimed is:

1. A finely adjustable firing valve comprising:
    a first pneumatic valve (10) that has a first inlet (20) and a first outlet (21) connected through a first actuation chamber (22);
    said first valve (10) also comprising a first shutter (23), adapted to move within said first actuation chamber (22) in order to alternately put into communication said first inlet (20) with said first outlet (21) or said first inlet (20) with a first connection conduit (33) in communication within said first actuation chamber (22);
    said first shutter includes a hole (26) which connects said first actuation chamber (22) with said first inlet (20);
    said firing valve further comprising a second pneumatic valve (11), adapted to command said first valve (10), comprising a second actuation chamber (36, 38), of an inferior volume than the first actuation chamber (22);
    said second valve (11) also comprising a second shutter (37), adapted to move within said second actuation chamber (36),
    to put alternatively in communication said first connection conduit (33) with a second outlet (35) or said first connection conduit (33) with a second connection conduit (40);
    said firing valve further comprising a third valve (12), able to control said second valve (11) comprising a third actuation chamber (42), of an inferior volume than the said second actuation chamber (36, 38);
    said third valve (12) also comprising a third shutter (43), able to move within said third actuation chamber (42),
    in order to alternately put into communication said second connection conduit (40) with a third connection conduit (41) or said second connection conduit (40) with a fourth connection conduit (44);

characterized in that the finely adjustable firing valve comprises:
- a piston (24) bound to said first shutter (23) that slides within said first chamber (22), of such a size that the upper surface of said piston (24) affected by the pressure inside said first chamber (22) is substantially equal to the lower surface of said piston (24) affected by the pressure present in said first inlet (20);
- a fourth chamber (30) connected to a fifth connection conduit (34), said fourth chamber (30) being of variable volume due to the movement of the piston (24).

2. The finely adjustable firing valve according to claim 1 characterized in that to said third connection conduit (41) is applied a first pre-fixed and adjustable pressure.

3. The finely adjustable firing valve according to claim 2 characterized by the fact that a firing command of said firing valve takes place by shifting from said first pressure to said second pressure.

4. The finely adjustable firing valve according to claim 1 characterized in that said third connection conduit (41) is applied a second pre-fixed pressure.

5. The finely adjustable firing valve according to claim 4 characterized by the fact that the firing command of said firing valve takes place by shifting from said first pressure to said second pressure.

6. The finely adjustable firing valve according to claim 1 characterized in that to said fourth connection conduit (44) is applied a third pre-fixed and adjustable pressure.

7. The finely adjustable firing valve according to claim 1 characterized in that to said fifth connection conduit (34) is applied a fourth pre-fixed and adjustable pressure.

8. The finely adjustable firing valve according to claim 1 is characterized in that the adjustment of operating pressures of said firing valve takes place by varying in combination the pressure applied to said fourth connection conduit (44) and to said fifth connection conduit (34).

9. The finely adjustable firing valve according to claim 1 characterized comprising a conduit that connects said second outlet (35) with said first outlet (21).

10. The finely adjustable firing valve according to claim 1, further including a variable pressure applied to said fourth connection conduit (44) and to said fifth connection conduit (34).

11. The finely adjustable firing valve according to claim 1, including a first pressure applied to said third connection conduit (41).

12. The finely adjustable firing valve according to claim 11, including a second pressure applied to said third connection conduit (41).

13. The finely adjustable firing valve according to claim 12, further including a third pressure applied to the fourth connection conduit (44).

14. The finely adjustable firing valve according to claim 13, further including a fourth pressure applied to said fifth connection conduit (34).

15. The finely adjustable firing valve according to claim 12, further including a firing command created by shifting from said first pressure to said second pressure.

* * * * *